United States Patent

Riddle

[11] Patent Number: 5,864,678
[45] Date of Patent: Jan. 26, 1999

[54] SYSTEM FOR DETECTING AND REPORTING DATA FLOW IMBALANCE BETWEEN COMPUTERS USING GRAB RATE OUTFLOW RATE ARRIVAL RATE AND PLAY RATE

[75] Inventor: Guy G. Riddle, Los Gatos, Calif.

[73] Assignee: Apple Computer, Inc., Cupertino, Calif.

[21] Appl. No.: 646,936

[22] Filed: May 8, 1996

[51] Int. Cl.⁶ .................................................. G06F 13/00
[52] U.S. Cl. ............................... 395/200.65; 395/200.61; 395/200.62; 370/232; 370/233
[58] Field of Search ..................... 370/232, 460, 370/253, 233; 345/501; 371/20.1; 395/872, 200.34, 200.65, 200.61, 200.62; 386/85; 358/412

[56] References Cited

U.S. PATENT DOCUMENTS

| | | | |
|---|---|---|---|
| 5,377,196 | 12/1994 | Godlew et al. | 371/20.1 |
| 5,402,412 | 3/1995 | Duffie et al. | 370/253 |
| 5,434,860 | 7/1995 | Riddle | 370/232 |
| 5,490,247 | 2/1996 | Tung et al. | 345/501 |
| 5,506,844 | 4/1996 | Rao | 370/468 |
| 5,566,000 | 10/1996 | Propach et al. | 358/412 |
| 5,608,653 | 3/1997 | Palmer et al. | 395/200.34 |
| 5,612,788 | 3/1997 | Stone | 386/85 |
| 5,623,483 | 4/1997 | Agrawal et al. | 370/253 |
| 5,664,226 | 9/1997 | Czako et al. | 395/872 |

*Primary Examiner*—Lee Hien Luu
*Attorney, Agent, or Firm*—Blakely, Sokoloff, Taylor & Zafman

[57] ABSTRACT

A method and apparatus for detecting and reporting flow imbalance of a data stream. A grab rate signal is generated measuring the rate at which a source machine can sequence and compress data from an input. Next, an outflow rate is generated measuring the rate at which the source machine can transmit the compressed data out to a network. When the compressed data arrives at a destination machine from the network, an arrival rate signal is generated measuring the rate at which the destination machine can re-sequence the compressed data for playback and decompression. Finally, a play rate signal is generated measuring the rate at which the destination machine can decompress and play the data to an output. The four rates are used in determining a flow imbalance signal and reporting the imbalance so that the user may correct any deficiencies in the data stream by modifying the quality/size or compression method used for the data transaction from the source.

10 Claims, 5 Drawing Sheets

AttemptBroadcast kp B59340 state 27
event 21 who B58E80
event 31 who B59340
New Deal B5AEC0 err 0
FireUpBroadcast n 0
event 15 who B59340
Flow Imbalance at 54752
   grab 201430 outflow 201430 arrival 187756 play 156083
Flow Imbalance at 55595
   grab 213036 outflow 213036 arrival 173178 play 103743
Flow Imbalance at 56017
   grab 215532 outflow 215532 arrival 194633 play 124263
Flow Imbalance at 56441
   grab 236244 outflow 236244 arrival 218064 play 141586
Flow Imbalance at 56863
   grab 272249 outflow 272249 arrival 259865 play 152976
Flow Imbalance at 57288
   grab 288407 outflow 288407 arrival 287310 play 163413
Flow Imbalance at 57710
   grab 280763 outflow 280763 arrival 299284 play 167279
Flow Imbalance at 58134
   grab 290222 outflow 290222 arrival 281925 play 163772
Flow Imbalance at 58559
   grab 296344 outflow 296344 arrival 293937 play 167229
Flow Imbalance at 58983
   grab 297815 outflow 297815 arrival 300732 play 170067
Flow Imbalance at 59423
   grab 219590 outflow 219590 arrival 296776 play 91939
from B59340 incoming message T 0

Sample Flow Rates for an Event
1000

SYSTEM FOR DETECTING AND REPORTING DATA FLOW IMBALANCE BETWEEN COMPUTERS USING GRAB RATE OUTFLOW RATE ARRIVAL RATE AND PLAY RATE

BACKGROUND OF THE INVENTION (1) Field of the Invention

The present invention relates to the networking of computer systems. More specifically, the present invention relates to data transmission between networked computer systems.

(2) Description of Related Art

Typically, when a source machine sends information over a network to a destination machine, measuring the precise rates at which data flows out of the source machine over the network and into the destination machine is not crucial for the applications on the source and destination machines which facilitate the transfer of information. Though a user may be concerned with the overall transmission rate of data, the user is not concerned with where specific bottlenecks in transmitting the data may exist, since the user can not generally modify the routes over which data is transmitted on a network. However, with the sending of video and audio information or other multimedia information, the bottlenecks in sending and receiving as well as compression of the information are all crucial when attempting to synchronize different streams of multimedia data such that when played together on the destination machine, the streams appear to the user as a cohesive presentation. For instance, for video and audio, "codecs", which stands for compression/decompression determine how the multimedia data is compressed before it is sent out over the network and subsequently, how it is decompressed after it is received at the destination. However, for many different codecs, the rate at which these codes operate to compress and decompress varies depending on the resolution and sampling rate of the data that is to be used (e.g., stereo vs. mono). Further, before the data is sent out over the network the modem or Ethernet communications device which sends the compressed audio or video information from the source machine and out to the network may have its own bottlenecks which affect the overall rate of the data. During network routing of the data, the many routers and gateways that are found on the network will drastically affect the flow of data as it attempts to reach the destination. Once at the destination, the data which usually comes over the network in "packets", must be reassembled and sequenced such that it can be decompressed and played or saved on the destination machine. The reassembly and also the decompression of the video and audio data also affects the ability of the multimedia presentation to be coherent and in real time. Often in a multimedia presentation, having both video and audio, the rates at which video stream and the audio stream are played must be synchronized properly if they are to appear as one coherent presentation to the user.

Thus, there is a need to be able to detect the various rates at which information is compressed, transmitted, sequenced and decompressed such that the rates and potential bottlenecks may be reported to a user or to a program to allow a better synchronization of multimedia data streams.

SUMMARY OF THE INVENTION

The present invention is a method and apparatus for discovering flow imbalance of multimedia data streams from a source machine to a destination machine. The invention generates two signals at the source machine, namely a "grab" rate signal and an "outflow" rate signal. The grab rate signal is the rate at which data is sequenced and formatted for transmission over a network. The outflow rate signal is the rate at which the communications device of the source machine sends the compressed data out over the network. The invention also detects and generates two signals at the destination machine, namely, an "arrival" rate signal and a "play" rate signal. The arrival rate signal is the rate at which the compressed data is received and reassembled at the destination machine. The play rate signal is the rate at which the destination machine decompresses the reassembled data and plays or saves the data stream on the destination machine. The four flow rate signals are generated at certain periodic intervals and once the play and arrival rate signals have been generated, the destination machine sends the play and arrival rate signals back to the source machine. Utilizing the flour flow rate signals in specified comparisons, the user or the source machine itself may, upon being reported these rates, fix or allow the user to fix perceived problems, such as compression technique, when an imbalance of flow rates threatens the continuity and synchronization of the multimedia data streams at the destination machine.

DETAILED DESCRIPTION OF THE INVENTION

Figure 1:
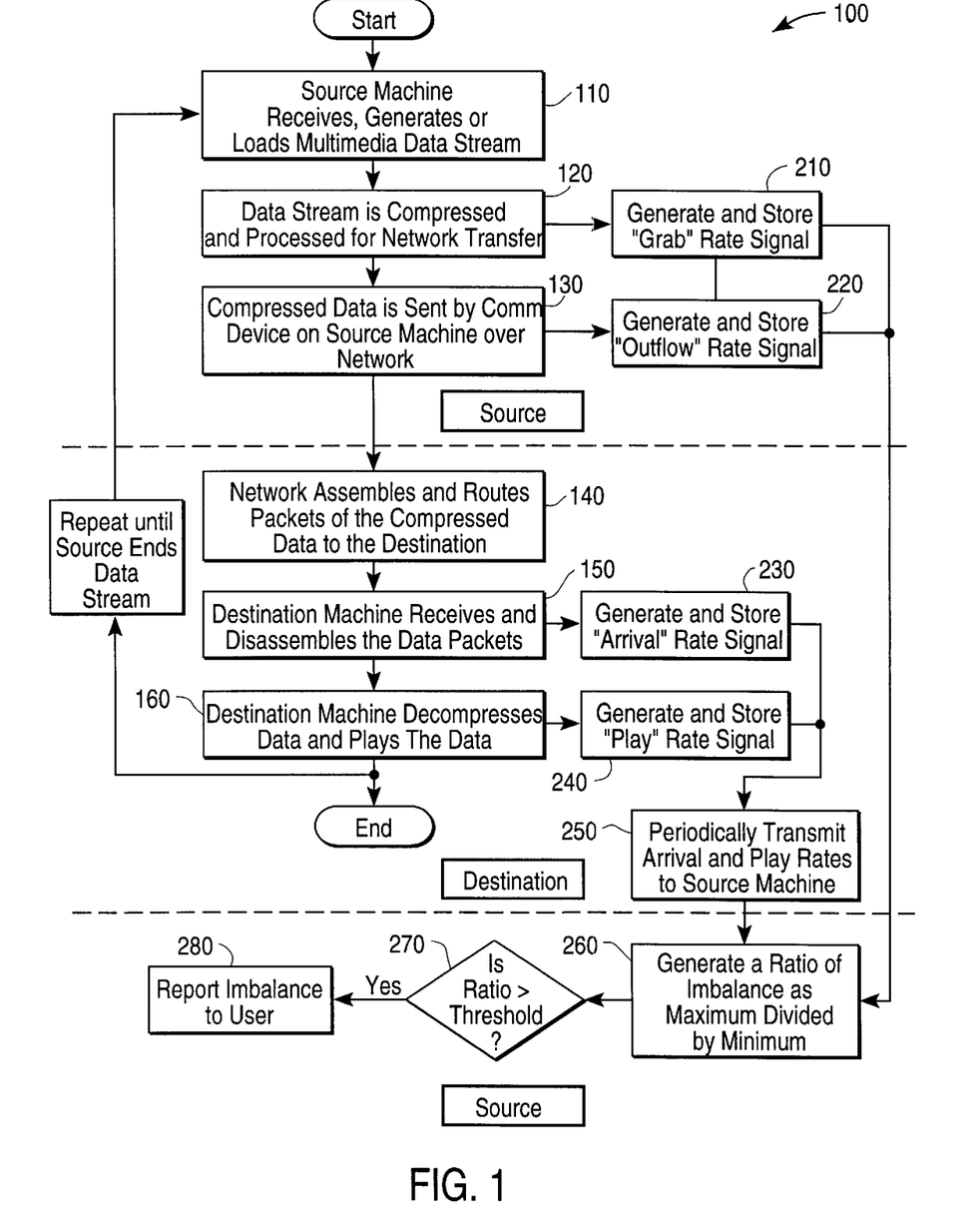
FIG. 1 is a flowchart detailing the method of detecting flow rates according to the present invention and a typical data stream transaction from a source machine to a destination machine.

FIG. 1 shows a flowchart of how and when the flow rates are generated as well as a typical multimedia data stream transaction between a source machine, which sends the multimedia data stream, and a destination machine, which plays the multimedia data stream for a user.

Though the various embodiments of the present invention are described with respect to differing rates or singals being measured, divided or otherwise compared, it will be appreciated that each of the rates described below corresponds to some signal within the source machine and destination machine which can be a voltage level, or other physical representation. Furthermore, these signals (rates) are generated according to the methods and with the apparatus discussed below.

A source machine receives, generates, or loads an input multimedia data stream such as video, audio or even subtitling text at step 110 in the flow chart. The multimedia input may be from a camera which can capture both video and audio data in real-time, such as for video teleconferencing, or the position of a moving cursor, or a Motion Pictures Entertainment Group video file (MPEG) or a Waveform Audio (.WAV) file which are static in that they have already been created and are not live or in real-time.

At step 120, the data stream received by the source machine is processed using a "codec" wherein the analog data is sampled and converted into digital form and compressed so that the digital data may then be streamed out over the network for transfer to another machine. At some periodic time, according to step 210, a "grab" rate signal is generated measuring the rate at which the data stream is processed (compressed) using a "codec" or null codec. Next, according to step 130, the compressed data stream is sent over the network by a communications device connected to the source machine. Also periodically, and preferably on the same data stream portion that the grab rate was measured, an "outflow" rate signal is generated measuring the rate at which the communications device, such as the modem, is able to send the compressed data stream out to the network (step 220). The outflow rate is measured at a point in time after actual network transfer as the data stream leaves the communications device. According to step 140, the network, whether it be a Local Area Network, a Wide Area Network, the Internet in general or even a wireless network, assembles and routes the compressed data as packets, according to several well-known protocols, such as Transmission Control Protocol (TCP) or User Datagram Protocol (UDP). No rate of network transfer is detected of measured in the preferred embodiment. However, in an alternative embodiment, a "network flow" rate which averages the flow rate of information across all routers or transport components of the network may also be measured.

When the compressed data stream, sent in "packets" (e.g., TCP or UDP packages) over the network, finally reaches the destination machine, the destination machine receives these packets and reassembles the packets into a sequenced data stream which can then be decompressed and played (step 150). At this point, according to step 230, an "arrival" rate signal is generated and stored measuring the rate at which the destination machine is able to receive the data packets and is able to reassemble the data packets, such that they are sequenced to be decompressed and played on the destination machine. Finally, according to step 160, the destination machine decompresses the data stream and plays the data, sending output over peripheral devices of the destination machine to the user or to other devices. At this point, a "play" rate signal is generated and stored, which measures the rate at which the multimedia data stream can be decompressed and played.

As step 250 shows, once the play rate is generated, then the arrival and play rates are transmitted back to the source machine such that the source machine may combine them with the locally measured (on the source machine) grab and outflow rates and process the rates into meaningful form. Accordingly, in step 260, the source machine generates a "ratio of imbalance", which is the relative level of flow imbalance among the four flow rates. In the preferred embodiment, the ratio of imbalance is generated as described below. First, a maximum of the grab rate, the outflow rate, the arrival rate and the play rate is located and stored as a "maximum flow rate". Next, the source machine locates a minimum of the grab rate, the outflow rate, the arrival rate and the play rate and stores the minimum as a "minimum flow rate". The ratio of imbalance is generated by dividing the maximum flow rate over the minimum flow rate.

According to step 270, the ratio can be compared to a threshold of imbalance. For example, if the threshold of imbalance is set to be 1.2, then according to step 280 if the ratio of imbalance is greater than 1.2, then the flow imbalance is reported to the user or to a program. If the ratio of imbalance is not greater than the threshold then flow imbalance detection repeats in the same manner as it had occurred before in the next set time period and a new ratio of imbalance is generated during the next period from newly measured flow rates. The threshold may be dynamically modified during the transaction by the application performing the flow detection.

The flowchart shown in FIG. 1 is not intended as an absolute timeline of steps. Rather, it represents the ideal case where a portion of the data stream has its four flow rates measured such that the comparisons of steps 260–280 are on the same or approximately the same portion of data. However, since steps 140–160 and steps 230–250 are performed on a destination machine which is across the network, these steps may occur simultaneously in time with steps 110–130 and steps 210–220 of the source machine. Thus, while the grab and outflow rates at steps 210 and 220 are generated for one portion of the data stream, the arrival and play rates may be for another portion of the data stream. Synchronization, through preferred, is not required since averaging reduces these latencies of the network. Further, by requiring the ratio of imbalance to exceed the threshold for multiple time intervals, such that the flow imbalance is sustained, the effects of latency may be further reduced.

The flowchart of FIG. 1 is segmented by dotted lines into steps performed on the source machine and steps performed on the destination machine. From step 250 to 260, for instance, the time lag may be quite large due to the latency in transmitting the play and arrival rates to the source machine. Depending on network conditions, this transmittal may be slow and, in the meantime, the source machine may have already started generating, according to steps 210 and 220, new grab and outflow rates for a new portion of the data stream. In a real time application, at step 110, data is constantly being input such that all the latencies of network transfer, from steps 130–140 or 250–260, for instance, make synchronization of rates difficult.

Figure 2:
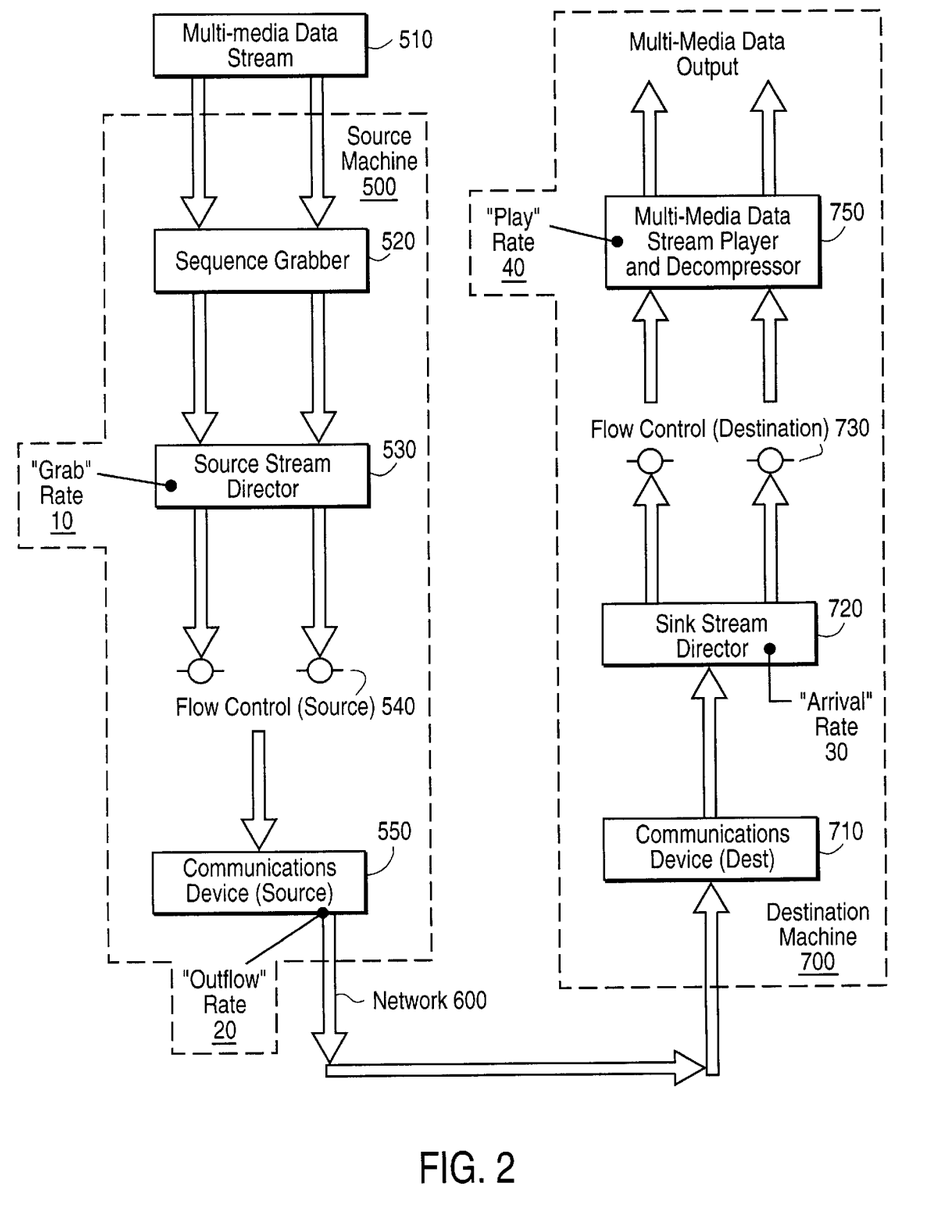
FIG. 2 shows a system level diagram of the components involved in sending a multimedia data stream from a source machine to a destination machine and shows where flow rates are generated according to the present invention.

FIG. 2 is a system level diagram of the components involved in sending a multimedia data stream from a source machine to a destination machine and shows where flow rates are generated.

FIG. 2 shows a video conferencing application, with several components, chiefly, a source machine 500, a network 600, and a destination machine 700. Multimedia data stream 510 may be composed of either video and/or audio data or any other multimedia data. This data stream 510 may originate from some input device connected to the destination machine such as a camera or a cursor control device. Further, multimedia data stream 510 may also be static as opposed to dynamic such that it originates from stored files such as Motion Pictures Entertainment Group (MPEG) file or a QuickTime movie file, or a stream of audio such as an Audio Interchange Format (AIF) file or a Waveform Audio (.WAV) file. The multimedia data stream 510 is read or piped into a sequence grabber which parses and separates multimedia data stream 510 into a sequence of frames or other such structure, which would allow the data to eventually be digitized such that it may be sent in a binary form over network 600. A source stream director 530 organizes the sequenced data generated by the sequence grabber 520 and may compress the sequences into a binary format more suitable for network transfer. Source stream director 530 may include one or several "codecs" which define the digital-to-analog and analog-to-digital compression and decompression utilized for multimedia data stream 510. Many such codecs have been developed and are well known in the art of multimedia compression. Whatever codec is used, the present invention generates a grab rate 10 at the point where the sequences are compressed and/or digitized to be sent over network 600. As the sequences of multimedia data are compressed and/or digitized for transfer over network 600 they are output to a flow control 540 on source machine 500 which acts as a buffer to control the flow of the compressed and/or digitized data coming from source stream director 530 as it is collected by a communications device 500 on the source machine. Communications device 550 on the source machine may be a regular 28.8 kilobits/second modem or an integrated services digital network (ISDN) device, an Ethernet port in a Local Area Network or even a wireless transceiver. Communications device 550 receives and sends the compressed data, which arrives from flow control 540, in packets out over network 600. At the point where communications device 550 transmits the compressed and/or digitized data as packets out onto network 600, an outflow rate 20 is generated. Outflow rate 20 measures how fast the communications device 550 is able to transmit the compressed and/or digitized data over network 600.

Network 600, as mentioned earlier, may be a Local Area Network (LAN), a Wide Are Network (WAN), or the interconnecting set of networks referred to as the "Internet" or a wireless network. Network 600 may be composed of many routers, hubs, gateways or other network transport components such as repeaters which transfer the multimedia data stream transmission between source machine 500 and destination machine 700. The routers and other transport components composing network 600 may change or be modified depending on certain conditions such as network traffic congestion, making it difficult for one component to transfer information to another component. Though the present invention utilizes no separate means for measuring the rate at which information is passed along network 600, such a feature may be utilized to provide additional information regarding flow rates. The present invention, however, does provide for an equivalent in that the arrival rate and outflow rate differential essentially measures the rate of network related loss.

Once the packets of compressed/digitized data from the source machine 500 successfully traverse through network 600, they will arrive at a destination machine 700 which has a communications device 710 which receives any packets of information that arrive through network 600. Communications device 710 is similar to communications device 550 in that it may be a regular modem, an ISDN device, or the Ethernet transport component of a LAN/WAN or a wireless device. Communications device 710 transports the packets of information to a sink stream direction 720 on destination machine 700, which reassembles the packets of information into a sequenced stream of data that may be played and decompressed.

At this point, an arrival rate 30 is generated which measures the rate at which sink stream direction 720 can reassemble and sequence the packets of information which arrive at communications device 710. Similar to flow control 540 on the source machine, a flow control 730 on destination machine 700 is provided which can act as a buffer to control piping the compressed/digitized data to a multimedia data stream player and decompressor 750. Multimedia data stream and decompressor 750 may be composed of several software and/or hardware components, such as video/audio codecs or video/audio playback hardware, which processes the compressed/digitized data and converts that data back to a analog format as in the example of audio. When the multimedia data stream player and decompressor 750 has decompressed and "played" the data to be output onto the screen or speaker or other output device of destination machine 700, a play rate 40 is generated which measures the rate at which multimedia data stream player and decompressor 750 can decompress and play the data sequenced from sink stream direction 720 through flow control 730.

Once play rate 40 has been generated, arrival rate 30 and play rate 40 are all send in a data structure back to source machine 500 through network 600. Source machine 500 may store these two rates along with the locally measured (relative to the source machine) grab rate 10 and outflow rate 20 for further processing.

Figure 3:
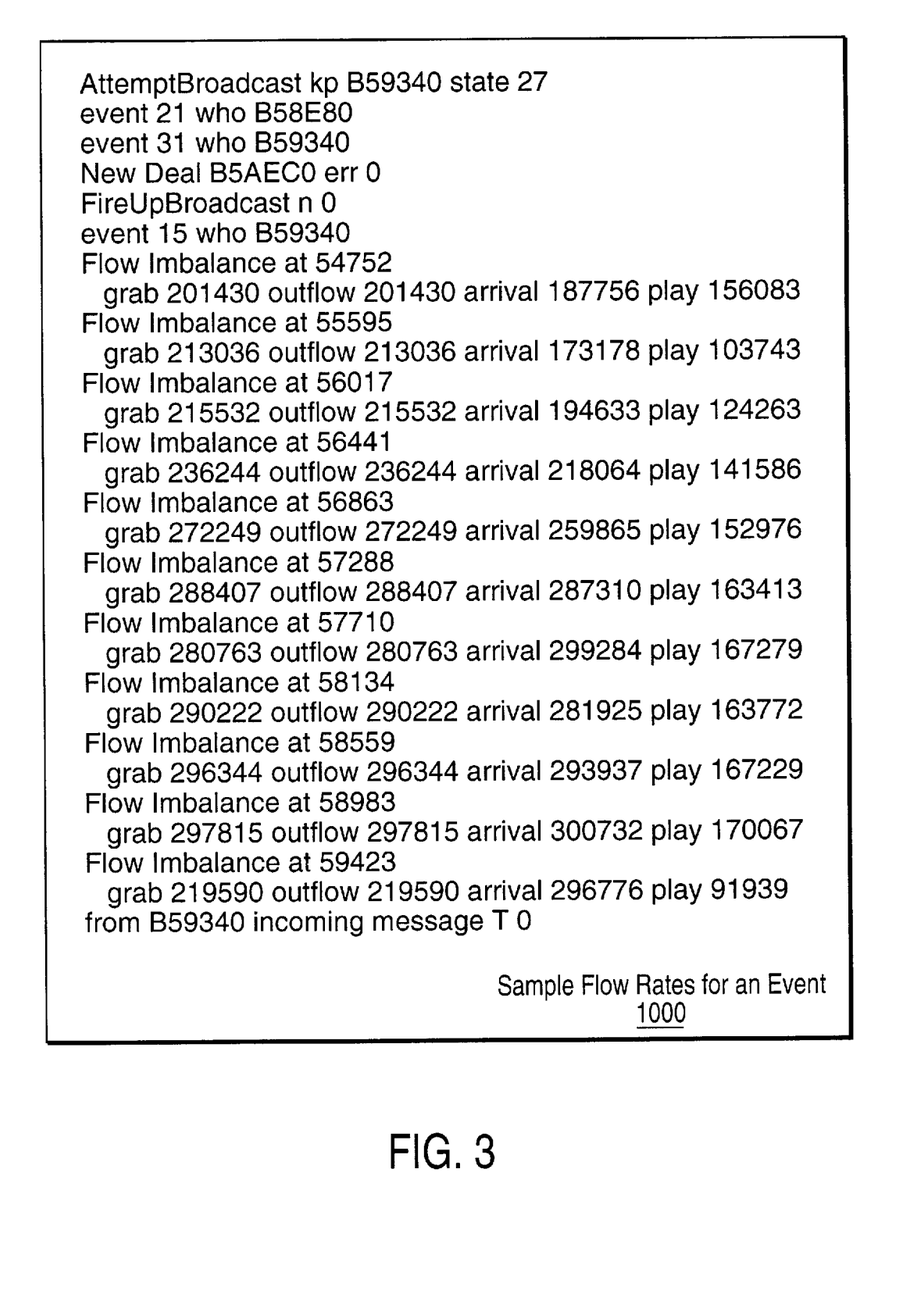
FIG. 3 shows generated flow rates at periodic intervals for video conferencing events according to the present invention.

FIG. 3 shows measured flow rates at certain intervals for a video conferencing event.

In each time index shown in the sample flow rates for an event 1000 of FIG. 3, the generated flow imbalance exceeded a certain threshold. Not shown are many time indices where the flow imbalance, as specified below, did not exceed a certain threshold. Each time index increment of 1 represent $\frac{1}{60}$ of a second in the video conferencing event. Thus, between time index 54752 and time index 55595, 14 second of real time have elapsed. At time index 54752, a grab rate of 201,430, and outflow rate of 201,430, an arrival rate of 187,756, and a play rate of 156,083 is shown. These numbers are the rates in bits-per-second which have been measured according to the method described with reference to FIG. 1. At time index 54752, as in most other time indices shown, the grab rate and the outflow rate are equal. The equality of the grab rate and the outflow rate indicates that the communications device utilized in this particular example was capable of transmitting the data over the network as quickly as the source stream director could compress the data. Referring back to FIG. 1, according to step 760, the ratio of imbalance is generated at time index 54752 as described below. First, the maximum flow rate is generated which is the maximum of the grab, outflow, arrival and play rates shown or, in this instance, 201,430. Similarly, the minimum flow rate of the four rates is found to be in this case, 156,083. The ratio of imbalance is computed as the maximum flow rate divided by the minimum flow rate, which in this instance is approximately 1.29. For the particular video conferencing event shown, if a threshold of 1.2 was set, then according to the method described for FIG. 1, the ratio of imbalance would be greater than the threshold and, thus, the imbalance would be reported to the user at the source machine by displaying a pop-up dialog on a display of the source machine.

The individual flow rates—the grab, outflow, arrival and play rates—can indicate where troubles in the data flow occur, thereby allowing the user at the source machine to modify the parameters of the date sent. As described earlier, when the outflow rate and the grab rate are identical, the communication device is operating as efficiently as necessary to transmit the data as it is sequenced by the source stream director. A great difference between the grab rate and outflow rate would indicate that a slow communication device is being used. A great difference between the outflow rate and the arrival rate may indicate loss of packets over the network. A difference in arrival rate and play rate is crucial since it may indicate that the size/resolution of the window on which the data is being played is too large, or that the codec used is too compute intensive for the destination machine.

An individual flow rate, such as the play rate or grab rate, may be measured according to some average technique such as a moving average. In a moving average, at each time index, a new measuring is taken of how much data has been transferred or processed. This amount is added to an existing moving average. The new measuring and the existing moving average are added and divided by two. The result is a new moving average.

Alternatively, individual flow rates may be measured by fixing two points in time and generating how much data has passed through or been processed in that interval. Preferably, all the four flow rates are measured using the same technique, whether by fixed interval or moving average such that some consistency and correlation can be preserved.

Referring again to FIG. 3, time index 57710 shows the extreme results due to network latency. Though the outflow rate was measured as 280763, the arrival rate is greater, namely 299284. This is a result of the latency involved in measuring the two rates on different network locations, one on the source and the other on the destination. The outflow rate shown was one reported back to the source machine; however, the outflow rate must wait for the play rate to be generated and then sent over the network to the source machine. The time involved in reporting the outflow and play rates can give slightly asynchronous results. This latency effect is reduced by using a moving average technique or by requiring that the threshold of flow imbalance be sustained for several time consecutive time indices before an imbalance is reported to the user or software.

Thus, as described above with reference to FIG. 3, a ratio of imbalance of 1.29 was generated at time index 54752. To reduce the effect of latency, another embodiment of the present invention can require that such a ratio be found at a specified number of consecutive or non-consecutive time indices. Thus, if three consecutive time indices are required to have their corresponding ratio exceed the threshold, then at time indices 55595, 55596 and 55597 the ratio of imbalance at each of these indices must exceed the threshold before a report to the user. The flow imbalance at 55595, as described before, would be the maximum of the four rates at time 55595 divided by the minimum which is 213036 divided by 103743, or 2.05. Likewise, at time index 56017, the flow imbalance is 215532 divided by 124263, or 1.75. If instead of three consecutive time indices, the requirement were that the ratio of imbalance exceed the threshold for some indices in a specified time, such as 21 seconds, then since the threshold of 1.2 has been exceeded at some time indices during that time ((56017−54752)/60 equals approximately 21 seconds), the flow imbalance problem may be reported to the user after the specified time of 21 seconds rather after just one thereby providing a more definitive imbalance diagnosis.

For instance, a grossly disproportionate play and arrival rate type of imbalance may be corrected by the user or software changing the resolution of the image or by choosing a codec that compresses/decompresses more quickly. For audio, the sampling of the audio at the source can be changed from stereo to mono such that more of the audio is represented in less bits thereby improving the flow of audio output (amount of audio transferred in the same time interval) at the destination.

Figure 4:
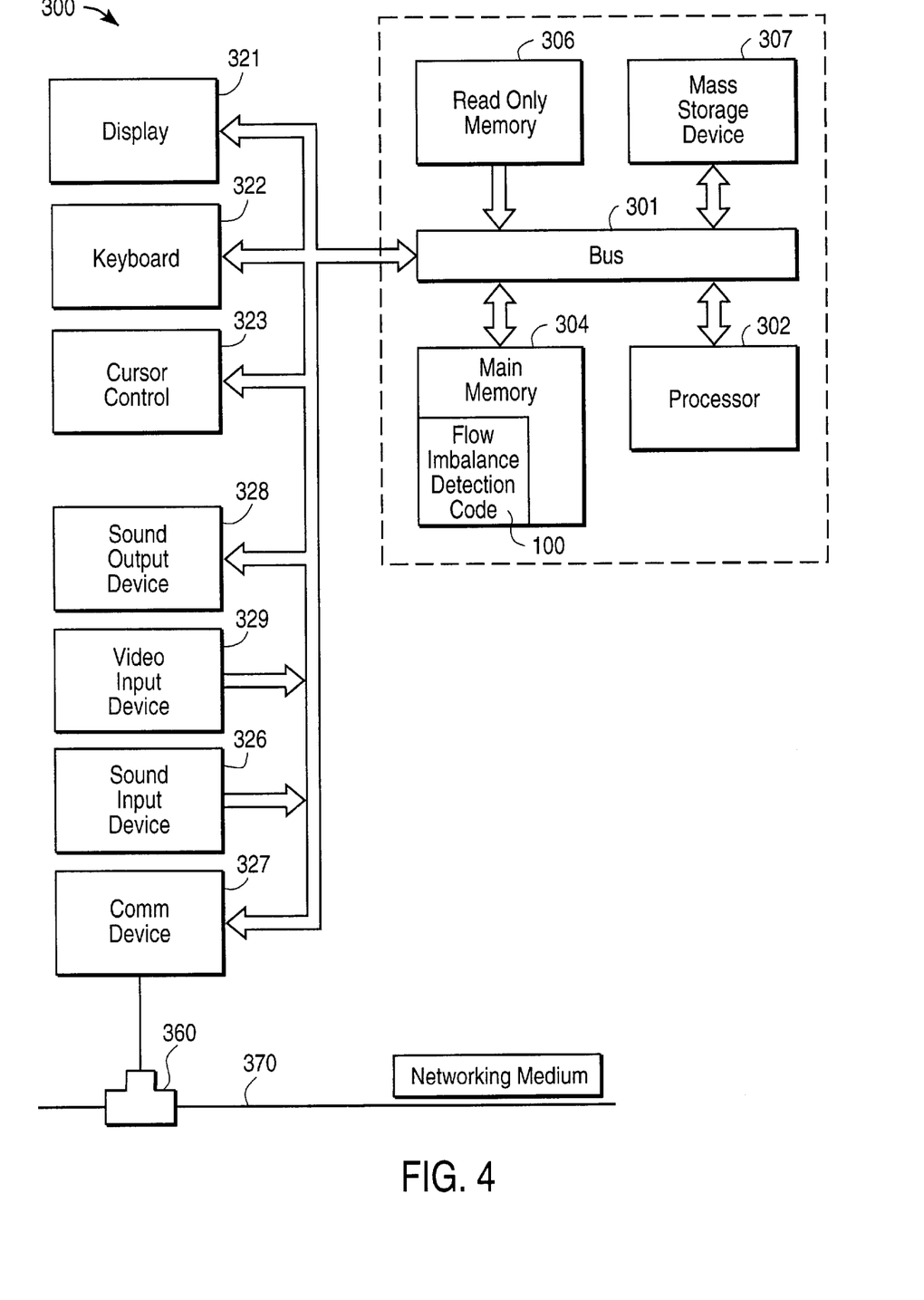
FIG. 4 shows a computer system implementing the present invention.

FIG. 4 is a diagram showing a computer system capable of implementing the present invention.

A computer system, such as a workstation, personal computer or other processing apparatus is detailed in FIG. 4. The sub-system 300 of the computer system comprises a bus or other communication means 301 for communicating information, and a process 302 coupled with bus 301 for processing information. Sub-system 300 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. Sub-system 300 also comprises a read only memory (ROM) and/or other static storage device 306 coupled to bus 301 for storing static information and instructions for processor 302, and a mass storage device 307 such as a magnetic disk or optical disk and its corresponding disk drive. Mass storage device 307 is coupled to bus 301 for storing information and instructions.

Sub-system 300 may further be coupled to a display 321 such as a cathode ray tube (CRT) or liquid crystal display (LCD) coupled to bus 301 for displaying information to a computer user. Such a display 321 may further be coupled to bus 301 for the receipt of video or image information. An alphanumeric input device 322, including alphanumeric and other keys may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321. For video teleconferencing applications, sub-system 300 may also have coupled to it a sound output device 328, a video input device 329, and sound input device 326, along with the associated D/A (Digital-to-Analog) and A/D (Analog-to-Digital) converters or software codecs for inputting or outputting media signal bitstreams. Sub-system 300 may further be coupled to communication device 327 which is coupled to network adapter 360 for communicating with other computers over network 370.

Figure 5:
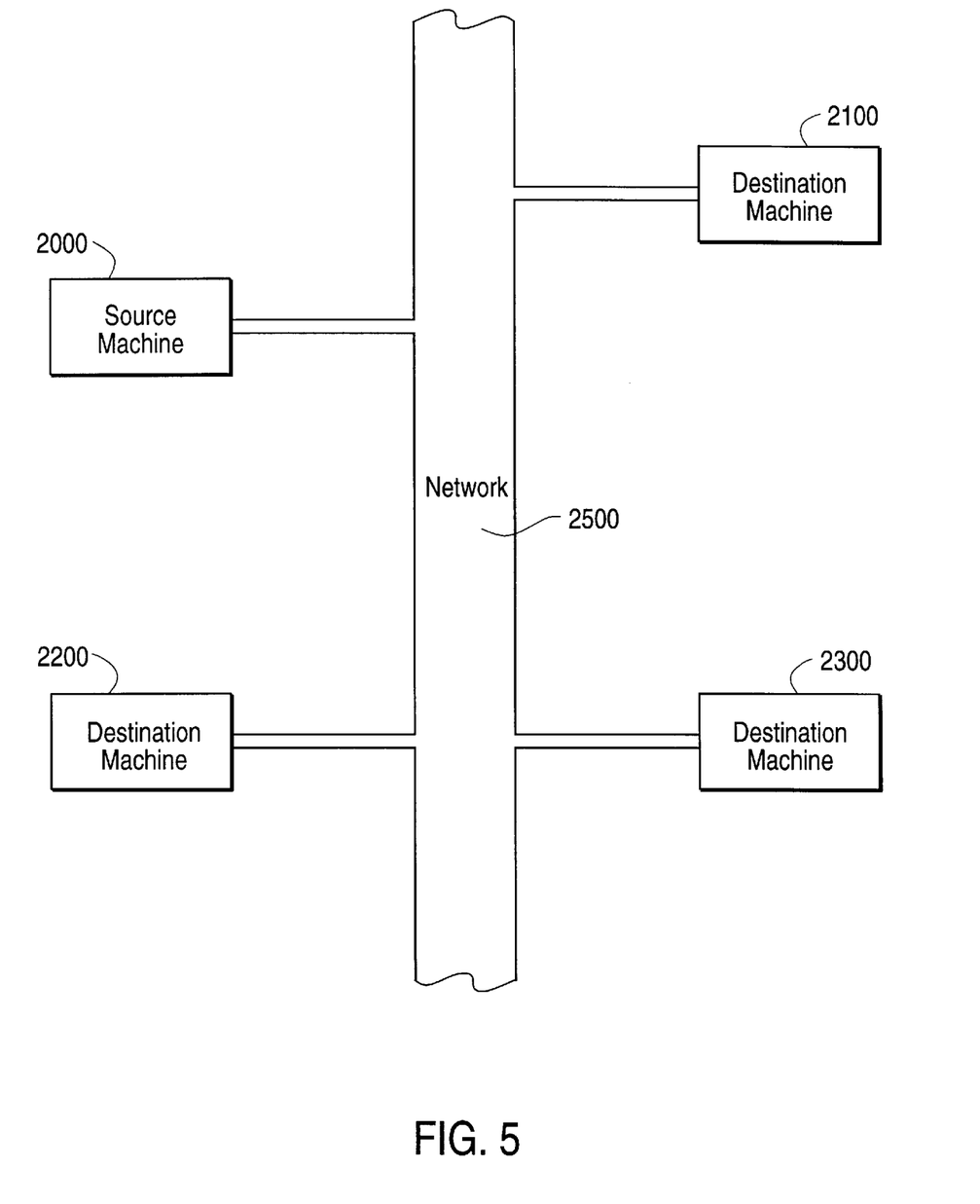
FIG. 5 shows the present invention operating in a multicasting environment.

According to the present invention, a multimedia data stream may be received from any of the input components shown in FIG. 5 such as sound input device 326, video input device 329, or even cursor control 323. The data stream is then sequenced and compressed by the processor for transmission over network 370. 302 acting in conjunction with main memory 304 and mass storage device 307 which may cache the data stream before, during and after compression and sequencing. The grab rate measures the rate at which data can be compressed and sequenced by the processor 302 operating in conjunction with main memory 304 and mass storage device 307. The processor has a clock (not shown), well known in the art, which is utilized by the present invention as a part of generating the various flow rates and for counting and fixing time intervals at which measurements are made. Once the data stream has been compressed, it is sent out over network 370 via communications device 327 and network module 360.

Main memory 304 is shown as having loaded the flow imbalance detection code 100 shown in and described for FIG. 1. Alternatively, processor 302 or other components may store/load code for the embodiment of FIG. 1 or any other embodiments described herein. The rate at which the communications device 327 operating in conjunction with network module 360 can send the compressed data as packets (described earlier) out onto the network is the outflow rate, which is measured like the grab rate except that the processor 302 also receives control signals from the communications device 327 indicating when packets have been sent so that the processor can generate the outflow rate. Communications device 327 also receives an arrival rate and a play rate from some destination machine(s) over network 370. The processor which is coupled to the communications device 327 and network 370 through bus 301, issued commands to store the arrival and grab rate in a data structure or file on either the main memory and/or mass storage device. The processor then generates the ratio of imbalance and make comparisons among the stored rates to diagnose the problem behind an imbalance. Further, through display 321 and even as a message through sound output device 328, the processor may issue commands to alert the user of a flow imbalance problem and potential solution. Through keyboard 322 and cursor control 323, the user may also interact with the processor to modify the type of codec used, the resolution of the video image sent or the quality of audio send so that coming portions of the data stream have less flow imbalance.

All of the rates (or signals) measured and generated according to this and other embodiments of the present invention are represented physically as signals in the apparatus described. These signals may be a voltage level of some electrical device or the registers of a computer system which are passed from between the processor, bus, main memory and other components of the computer system shown in FIG. 4.

In an alternative embodiment, FIG. 4 also represents the case of the present invention utilized wherein the source and destination are the same physical machine. Even if playing a multimedia or other data stream on one machine, and not over the network, the four rates, grab rate, arrival rate, outflow rate and play rate still are meaningful measures of imbalance. For instance, assume that the input if a QuickTime movie file stored on mass storage device 307, which can be either a magnetic media (hard disk) or even optical media (CD-ROM drive), to be played on display 321. The grab rate, as generated by processor 302 is the rate then at which the QuickTime data can be read into main memory 304 from mass storage device 307. The outflow rate, since there is no network required in this embodiment is the rate at which the data can be written from main memory 304 or well-known buffering mechanism in the art such as a cache (not shown) and passed to the hardware (video card, not shown) or software (codec) which decompresses the data. The rate at which the decompression to main memory 302, a cache or even mass storage device 307 occurs, is generated by the processor as the arrival rate. When the decompressed data is loaded and played to display 321, and to sound output device 328, the processor 302 can using the results of the playing, generate a play rate. Many modifications of how/where the four flow rates are generated and what each signifies are possible depending upon the hardware or software employed to store, read, decompress and play, as the case may be.

Although a general purpose computer system has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

FIG. 5 illustrates a multi-casting environment in which the present invention may operate.

In a "multi-casting" environment, one source machine sends data on a multi-casting broadcast address such that multiple destination machines may "listen" to the broadcast and receive the data. The data structures and timing used in generating flow rates can be modified in multi-casting such that each destination machine can separately report their respective arrival and play rates, or such that an average is taken to generate an overall flow imbalance across the broadcast.

FIG. 5 shows a multi-casting environment with three potential recipients. Source machine 2000 is shown coupled to network 2500. A first destination machine 2100, a second destination machine 2200 and a third destination machine 2300 are all shown also coupled to network 2500. After source machine 2000 has sent a multimedia data stream over network 2500, each of the three destination machines 2100, 2200 and 2300, if so equipped will be able to "listen" to the data stream on a broadcast address and be able to play the data stream locally. Each of the destination machines 2100, 2200 and 2300, of they choose to receive the multi-cast will generate is own arrival rate and play rate according to the method and apparatus described above. When a destination machine has generated its play and arrival rates these rates will be sent in a data structure to the source machine to combine with the locally measured grab and outflow rates. The source machine will be adapted, therefore, to store play and arrival rates for different multi-cast destinations and can process them individually by generating a flow imbalance for each of the destination machines, or average the rates or average the ratios, or a combination thereof.

I claim:

1. A method of detecting flow imbalance of data transacted between a source and a destination, said method comprising the steps of:

generating a grab rate signal which is a representation of a first measured rate at which said data is processed to be transmitted out of said source and to said destination and a outflow rate signal which is a representation of a second measured rate at which said processed data is assembled and transmitted from said source;

generating an arrival rate signal which is a representation of a third measured rate at which said processed data is received and reassembled at said destination and a play rate signal which is a representation of a fourth measured rate at which said processed data is unprocessed and output from said destination;

comparing said grab rate signal, said outflow rate signal, said arrival rate signal and said play rate signal according to a specified formula to generate a flow imbalance signal; and reporting at said source than an imbalance occurred if said flow imbalance signal exceeds a certain threshold signal.

2. A method of detecting flow imbalance according to claim 1 wherein said data includes multimedia data.

3. A method of detecting flow imbalance according to claim 1 wherein said step of comparing includes the steps of:

generating a maximum flow rate signal by finding a maximum among said grab, outflow, arrival and play rate signals;

generating a minimum flow rate signal by finding a minimum among said grab, outflow, arrival and play rate signals; and generating said ratio of flow imbalance signal by comparing said maximum flow rate signal by said minimum flow rate signal.

4. A method of detecting flow imbalance according to claim 1 wherein said steps of generating said grab rate signal and outflow rate signal and generating said arrival rate signal and said play rate signal is performed using a moving average.

5. A method of detecting flow imbalance according to claim 1 wherein detection is performed on a periodic basis while said data us transacted between said source and said destination.

6. A method of detecting flow imbalance according to claim 1 further comprising the step of reporting at said source than an imbalance occurred if several ratio of imbalance signals generated over a certain time interval all exceed a certain threshold.

7. An apparatus for detecting flow imbalance of data, said apparatus comprising:
 a network;
 a source machine coupled to an input which generates said data wherein said source machine is coupled to said input to generate a grab rate signal which is a representation of a first measured rate at which said data is processed to be transmitted out of said machine, further wherein said source machine is coupled to said network to generate an outflow rate signal which is a representation of a second measured rate at which said processed data is assembled and transmitted from said source machine;
 a destination machine coupled to said network to receive said data from said source machine and to generate an arrival rate signal which is a representation of a third measured rate at which said processed data is received and reassembled at said destination machine, further wherein said destination machine is coupled to an output to play said data and coupled to said output to generate a play rate signal which is a representation of a fourth measured rate at which said processed data is unprocessed and output on said destination machine, said destination machine coupled to said network to send said arrival rate signal and said play rate signal to said source machine; and
 a processor computes a flow imbalance of data transacted between said source machine and said destination machine utilizing said grab rate signal, said outflow rate signal, said arrival rate signal, and said play rate signal.

8. An apparatus for detecting flow imbalance of data, said apparatus comprising:
 a network;
 a source machine coupled to an input which generates said data wherein said source machine is coupled to said input to generate a grab rate signal which is a representation of a first measured rate at which said data is processed to be transmitted out of said source machine, further wherein said source machine is coupled to said network to generate an outflow rate signal which is a representation of a second measured rate at which said processed data is assembled and transmitted from said source machine; and
 a plurality of destination machines coupled said network to each receive said data, each of said destination machines coupled to said network to generate its own arrival rate signal which is a representation of a third measured rate at which said processed data is received and reassembled at said destination machine, further wherein each of said destination machines is coupled to its own output to play said data and coupled to its own output to generate its own play rate signal which is a representation of a fourth measured rate at which said processed data is unprocessed and output on said destination machine, said destination machines coupled to said network to send said arrival rate signals and said play rate signals to said source machine; and
 a processor computes flow imbalance of data transacted between said source machine and said destination machines utilizing said grab rate signal, said outflow rate signal, said arrival rate signals, and said play rate signals.

9. In a computer system, an apparatus for detecting flow imbalance of data, said apparatus comprising:
 a processor coupled to a network to transmit a data stream over said network wherein said processor computes a measured grab rate and a measured outflow rate and is coupled to said network to receive a measured play rate and an measured arrival rate; and
 a memory coupled to said processor to compute a flow imbalance utilizing said grab rate, said outflow rate, said play rate and said arrival rate, further wherein said memory is coupled to said processor and to said network to store said flow imbalance and said grab rate, said outflow rate, said arrival rate and said play rate.

10. In a computer system, an apparatus for detecting flow imbalance of data, said apparatus comprising:
 a processor coupled to a bus to transmit a data stream over said bus wherein said processor computes a measured grab rate and a measured outflow rate and is coupled to said bus to receive a measured play rate and an measured arrival rate; and
 a memory coupled to said processor to compute a flow imbalance utilizing said grab rate, said outflow rate, said play rate and said arrival rate, further wherein said memory is coupled to said processor and to said bus to store said flow imbalance and said grab rate, said outflow rate, said arrival rate and said play rate.

* * * * *